US008745076B2

(12) United States Patent
Pazdziora

(10) Patent No.: US 8,745,076 B2
(45) Date of Patent: Jun. 3, 2014

(54) STRUCTURED QUERY LANGUAGE SYNTAX REWRITING

(75) Inventor: Jan Pazdziora, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 752 days.

(21) Appl. No.: 12/353,226

(22) Filed: Jan. 13, 2009

(65) Prior Publication Data

US 2010/0185645 A1   Jul. 22, 2010

(51) Int. Cl.
*G06F 17/30* (2006.01)

(52) U.S. Cl.
USPC .......................................... 707/760; 707/759

(58) Field of Classification Search
USPC .................. 707/762, 760, 999.104, 999.107, 707/999.102, 999.103, 759
See application file for complete search history.

(56) References Cited

U.S. PATENT DOCUMENTS

| 5,228,116 | A  | * | 7/1993  | Harris et al. | 707/999.104 |
| 5,812,840 | A  | * | 9/1998  | Shwartz | 707/999.004 |
| 6,496,833 | B1 | * | 12/2002 | Goldberg et al. | 707/999.102 |
| 6,704,726 | B1 | * | 3/2004  | Amouroux | 707/999.004 |
| 2004/0128276 | A1 |   | 7/2004 | Scanlon et al. | |
| 2005/0149537 | A1 | * | 7/2005 | Balin et al. | 707/100 |
| 2010/0185645 | A1 | * | 7/2010 | Pazdziora | 707/760 |

OTHER PUBLICATIONS

Object and Relational Mapping (ORM) With Hibernate, http://www.jboss.com/pdf/HibernateBrochure-Jun2005.pdf, www.jboss.com, RT#297930-1/07, 4 pgs.
DMD::Proxy-A Proxy Driver for the DBI, CPAN, http://search.cpan.org/~timb/DBI-1.607/lib/DBD/Proxy.pm, weblocal.ca Jan. 13, 2009, 6 pgs.
Metamatrix Enterprise Data Services Platform Supports Master Data Management, http://www.redhat.com/f/pdf/metamatrix/MetamatrixMasterDataManagement_web.pdf, www.redhat.com/jboss, #473434-10/07, 4 pgs.

* cited by examiner

*Primary Examiner* — Vincent F Boccio
(74) *Attorney, Agent, or Firm* — Lowenstein Sandler LLP

(57) ABSTRACT

The database command rewriting system rewrites a first database command that includes language specific for a first database management system command into a second database command suitable for a second database management system. The database command rewriting system receives the first database command and identifies the specific language. Furthermore, the database command rewriting system retrieves a rule based on the identified language. Using the retrieved rule, the database command system rewrites the first database command to the second database command and transmits the second database command to the second database management system.

25 Claims, 7 Drawing Sheets

STRUCTURED QUERY LANGUAGE SYNTAX REWRITING

TECHNICAL FIELD

Embodiments of the present invention relate to a method and system for database management. Specifically, embodiments of the invention relate to a method and system for rewriting of structured query language commands.

BACKGROUND

Operators employ system management solutions to assist in managing multiple computers, from tens of computers to over tens of thousands computers. System management systems can be used to inventory the hardware and software on these computers, install and update software on these computers, collect and distribute custom software packages into manageable groups, provision computers, manage and deploy configuration files, monitor these computers, provision and start/stop/configure virtual guests, and distribute content across multiple geographical sites in an efficient manner. Because of the large numbers of computers that can be managed by the system management solutions, large amounts of information pertaining to the managed computers is generated by these solutions.

To support this large amount of stored information, the system management solutions includes a database management system. A database management system is a software system that is used for building, maintaining and accessing a database. There are several databases management system known in the art that can be employed by a systems management solutions (ORACLE™ Database Management System (DBMS), MYSQL™, IBM DB2™, POSTGRESQL™, MICROSOFT SQL™, etc.). Each of these database managements systems can use a relational database that is based on the structured query language (SQL). SQL is a standard query language for retrieving, adding and updating information from database systems. However, each DBMS can add non-standard SQL extensions to that are specific to that DBMS, implement part of a standard SQL, and/or implement different SQL standards or non-standard SQL extensions in different versions. When non-standard SQL extensions are used by the system management solution, then that system management solution is tied to corresponding DBMS. To change the DBMS used for the system management solution would require rewriting the SQL extensions used by the solution management system. This is typically done by changing the application code of the software used in the solution management system, which can be a very difficult task.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

The database proxy system rewrites SQL commands and results for different DBMS that are used by system management solutions. The database proxy system receives SQL commands that include non-standard SQL language specific to a first DBMS. The database proxy system identifies the non-standard SQL language determines a rule to be used to rewrite the non-standard SQL. The database proxy system rewrites the received SQL commands using the rule into a form that can be used with a second DBMS. Furthermore, the database proxy system transmits the rewritten rule to the second DBMS. The database proxy system receives the response from the second DBMS, translates the response if needed and sends the (translated) response to the system management solution.

While the database proxy system is illustrated below rewriting SQL commands in the context of a system management solution, the database proxy system is not so limited. In alternate embodiments, the database proxy system rewrites SQL commands for any application or application suite that communicates with a DBMS and needs to be ported to another DBMS without modifying the code of the application or application suite. Examples of applications or application suites that can be used with the database proxy system are a web server coupled to a database backend, telecommunications billing system, invoicing system, university information system, retail warehouse system, and/or any other system that could migrate to use a different database management system without changing the application code.

Figure 1:
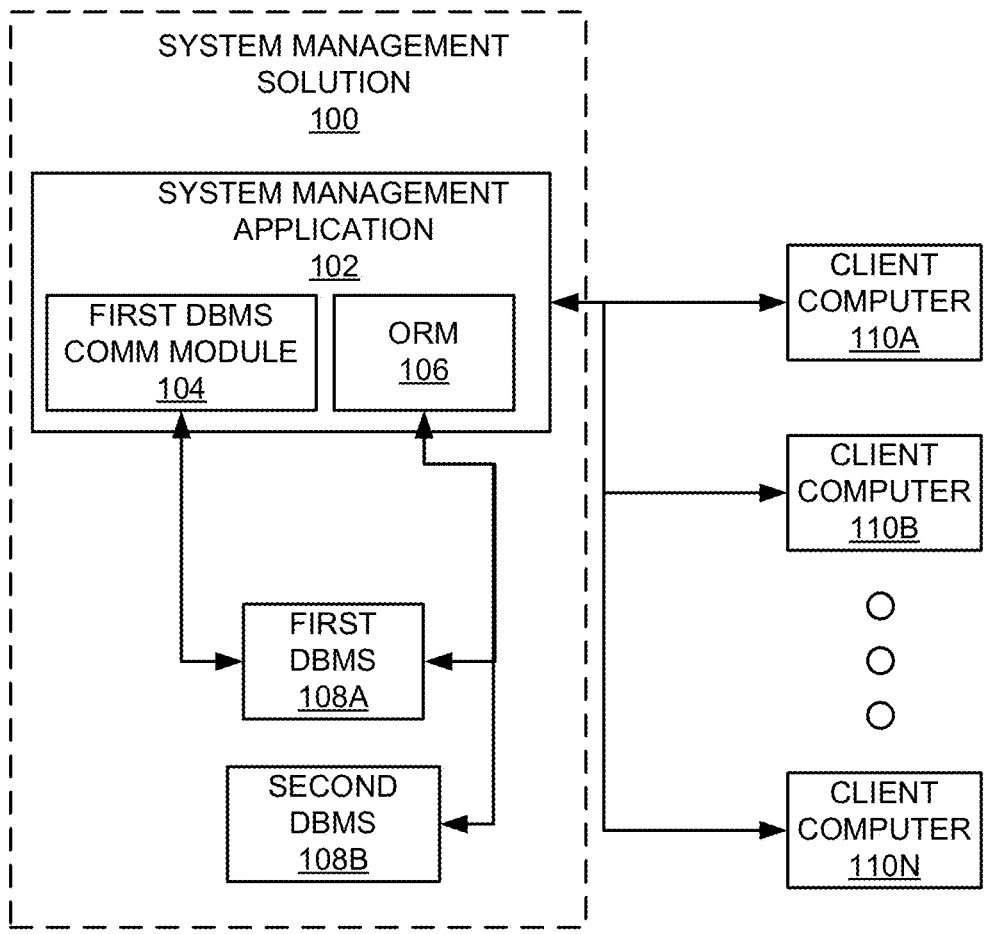
FIG. 1 is a block diagram of system management solution using a DBMS.

FIG. 1 is a block diagram of system management solution 100 that uses one or more DBMS. In FIG. 1, system management solution 100 comprises system management application 102 and DBMS 108A-B. System management solution 100 manages client computers 110A-N by inventoring the client computer hardware and software, installing and updating software, collecting and distributing custom software packages into manageable groups, provisioning the client computers, managing and deploying configuration files, monitoring the client computers, provisioning and starting/stopping/configuring virtual guests, and distributing content across multiple geographical sites. Client computers 110A-N can be a personal computer, server, laptop, networking equipment, printer, etc.

System management application 102 stores the information for client computers 110A-N using one of DBMS 108A-B via first DBMS communication module 104. System management application 102 uses SQL commands to create tables on these DBMS 108A-B using SQL commands, store information for client computers 110A-N, and/or retrieve information about client computers 110A-N. SQL commands can be a standardized SQL command that are understood by both first and second DBMS 108A-B. In addition, each DBMS can have its own unique differences from other DBMSes, such as proprietary non-standard SQL extensions that are particular to that DBMS or less than complete support for a SQL standard. First DBMS communication module 104 uses these unique differences of first DBMS 108A. For examples first DBMS communication module 104 uses first DBMS 108A SQL extensions, such as proprietary character types, outer joins, binary object storage, namespace resolution, etc. Because first DBMS communication module 104 uses non-standard SQL extensions particular to first DBMS 108A, first DBMS communication module 104 is tied to that DBMS. Thus, first DBMS communication module 104 does not directly use second DBMS 108B.

DBMS 108A-B are divided into two different groups: first DBMS 108A and second DBMS 108B. First DBMS 108A is the DBMS tied to first DBMS communication module 104, whereas second DBMS is a DBMS that is not supported by first DBMS communication module 104. DBMS 108A-B can be any one of DBMS known in the art: ORACLE™ DBMS, MYSQL™, IBM DB2™, POSTGRESQL™, MICROSOFT SQL™, etc. In one embodiment, DBMS 108A-B differ in the different sets of SQL commands each DBMS 108A-B supports. DBMS 108A-B can support different non-standard SQL extensions and/or different levels of the SQL standard. In addition, and in one embodiment, DBMS 108A-B are different versions of the same type of DBMS.

To get over the restriction of first DBMS communication module 104, system management application 102 includes object relational manager (ORM) (not shown), which can communicate with anyone of the different DBMS 108A-B using SQL commands appropriate for each DBMS. ORM is object relational module that translates objects used by system management application 102 into a format that can be stored in one of DBMS 108A-B. Although ORM has the support for multiple DBMS 108A-B, it can be unpractical for ORM to replace the function of first DBMS communication module 104. This is because first DBMS communication module 104 can include a large amount of functionality that is impractical to convert to ORM. For example, first DBMS communication module 104 can have up to 10,000 SQL commands. Converting this amount of SQL infrastructure can be a large undertaking.

As illustrated in FIG. 1, systems management solution 100 is either tied to one DBMS or can support different DBMSes at the expense of converting existing the codebase of systems management solution 100. Instead of modifying or replacing first DBMS communications module 104, a proxy can be used to intercept SQL commands from first DBMS communications module 104 and rewrite these commands for a different DBMS.

Figure 2:
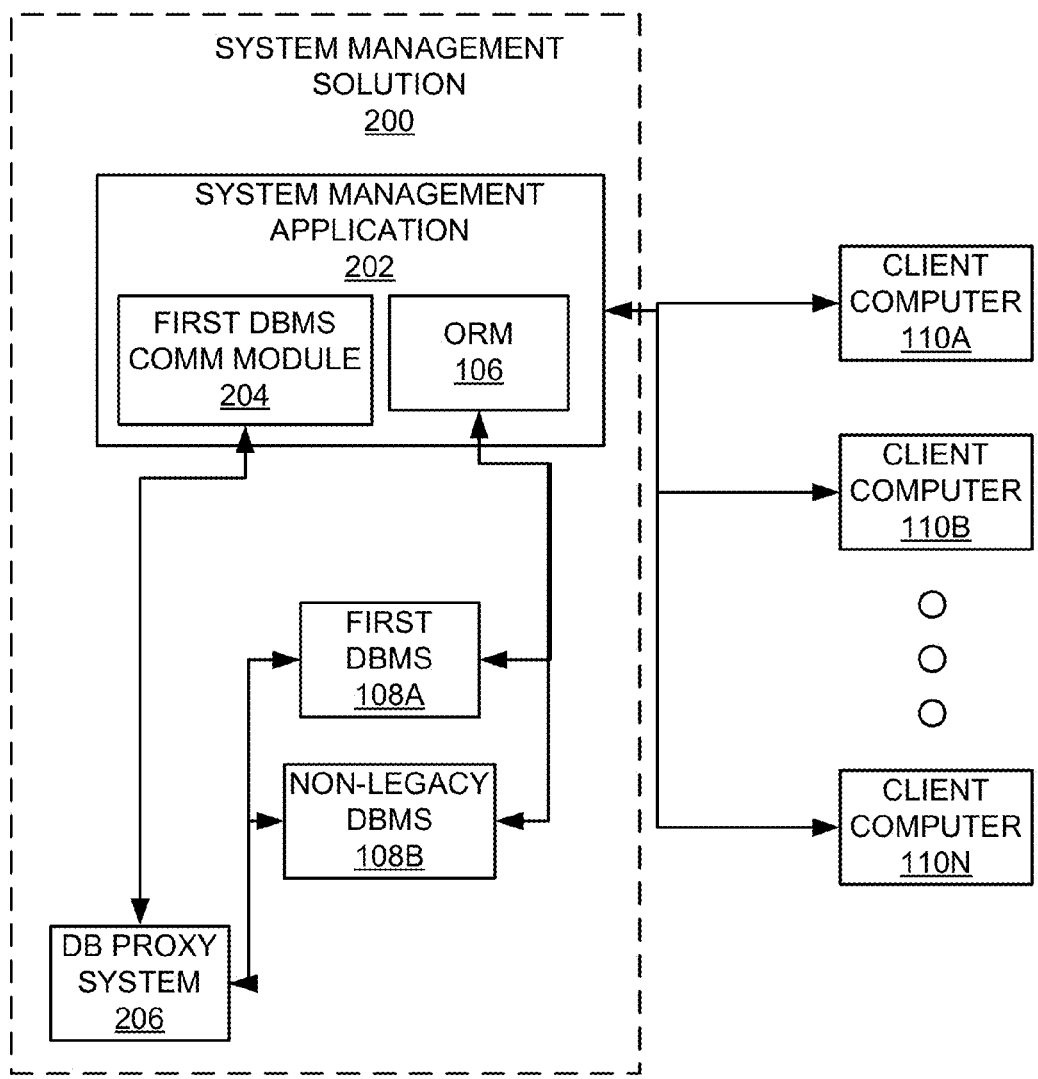
FIG. 2 is a block diagram of one embodiment of a database proxy system rewriting SQL commands for a solution management system.

FIG. 2 is a block diagram of one embodiment of a database proxy system 206 rewriting SQL commands for a system management solution 200. In FIG. 2, system management solution 200 manages client computers 110A-N and comprises system management application 202, one or more of DBMS 108A-B, and database proxy system 204. Similar to FIG. 1, system management solution 202 comprises first DBMS communication module 204. Furthermore, first DBMS communication module 204 is structured to use SQL commands for first DBMS 108A as described in FIG. 1 above.

Unlike in FIG. 1, first DBMS communication module 204 does not directly communicate with first DBMS 108A. In FIG. 2, first DBMS communication module 204 sends the SQL commands to database proxy system 206, database proxy system 206 rewrites the SQL command, and database proxy system 206 routes the rewritten SQL command to second DBMS 108B. By using the scheme, first DBMS communication module 204 supports second DBMS 108B without modifying the software codebase of first DBMS communication module 204. Thus, database proxy system 206 is rewriting the SQL commands on the fly.

In one embodiment, first DBMS communication module 204 is configured to open an SQL connection with database proxy system 206 using SQL connections scheme known in the art (local connections, transmission control protocol/internet protocol (TCP/IP), standard SQL connection request, non-standard connection requests, etc.). In response, database proxy system 206 opens a SQL connection with one of the second DBMS 108B. In this embodiment, database proxy system 206 reads configuration information to determine which second DBMS 108B should be used. Database proxy system 206 signals to first DBMS communication module 204 that an SQL connection is opened.

With the SQL connection to the appropriate second DBMS 108B, database proxy system 206 receives SQL commands from first DBMS communication module 204 that are meant for a DBMS that is the same type as first DBMS 108A and rewrites these SQL commands into a format appropriate for one of second DBMS 108B. In one embodiment, database proxy system 206 scans a received SQL command for SQL language specific to first DBMS 108A and not supported in second DBMS 108B. For example, the received SQL command could contain non-standard schema creation language, namespace references, syntax of some SQL commands (outer joins, etc.), object conversion, etc. Alternatively, the received SQL command contains standard SQL language that is not supported by second DMBS 108B. In this embodiment, database proxy system 206 identifies the unsupported SQL language and looks up a rule for this unsupported language. "Unsupported SQL" language or command is to mean hereinafter SQL language and/or command that are not supported by the target DBMS (e.g. DBMS 108B) or SQL language and/or command that is identified to be modified by the database proxy before sending to the target DBMS for some other reason (efficiency reasons, etc.).

In one embodiment, the rule instructs database proxy system 206 on how to rewrite the non-standard SQL language for second DBMS 108B. Database proxy system 206 uses this rule to convert the unsupported SQL language to language appropriate for second DBMS 108B. Database proxy system 206 can rewrite some or all of the received SQL command. Database proxy system 206 sends the rewritten SQL command to second DBMS 108B for processing. Database proxy system 206 rewrites the SQL command using standard SQL constructs, SQL extensions supported by DBMS 10B, and/or combinations thereof.

While in one embodiment, second DBMS 108B is one DBMS or one type of DBMS, in alternate embodiments, database proxy system can support multiple DBMS or multiple different types of DBMS. Furthermore, in another embodiment, database proxy system 206 can proxy SQL commands for first DBMS 108A. In this embodiment, database proxy system 206 just forwards SQL commands and responses between first DBMS communication module 204 and first DBMS 108A as sent.

Second DBMS 108B processes the rewritten SQL command and returns the results to database proxy system 206. In one embodiment, second DBMS 108B returns a return code or another response that needs no rewriting by database proxy system 206. In this embodiment, database proxy 206 sends this response, unrewritten, to first DBMS communication module 204. In an alternate embodiment, database proxy system 206 determines that the response from the second DBMS 108B contains information is not in the form expected by first DBMS communication module 204. For example and in one embodiment, first DBMS communication module 204 sends a unsupported SQL command that requests a binary object from first DBMS 108A. In this embodiment, first DBMS 108A supports binary object storage, whereas second DBMS 108B does not. Instead, second DBMS 108B stores the object contents in a table. Database proxy system 206 responds to the object request by rewriting the object request SQL command to a command that retrieves the object contents from second DBMS 108B. Database proxy system 206 receives the object contents, creates an object based on the object contents and sends the object to first DBMS communication module. By using database proxy system 206, first DBMS communication module 204 can use second DBMS 108B without modifying first DBMS communication module 204.

Figure 3:
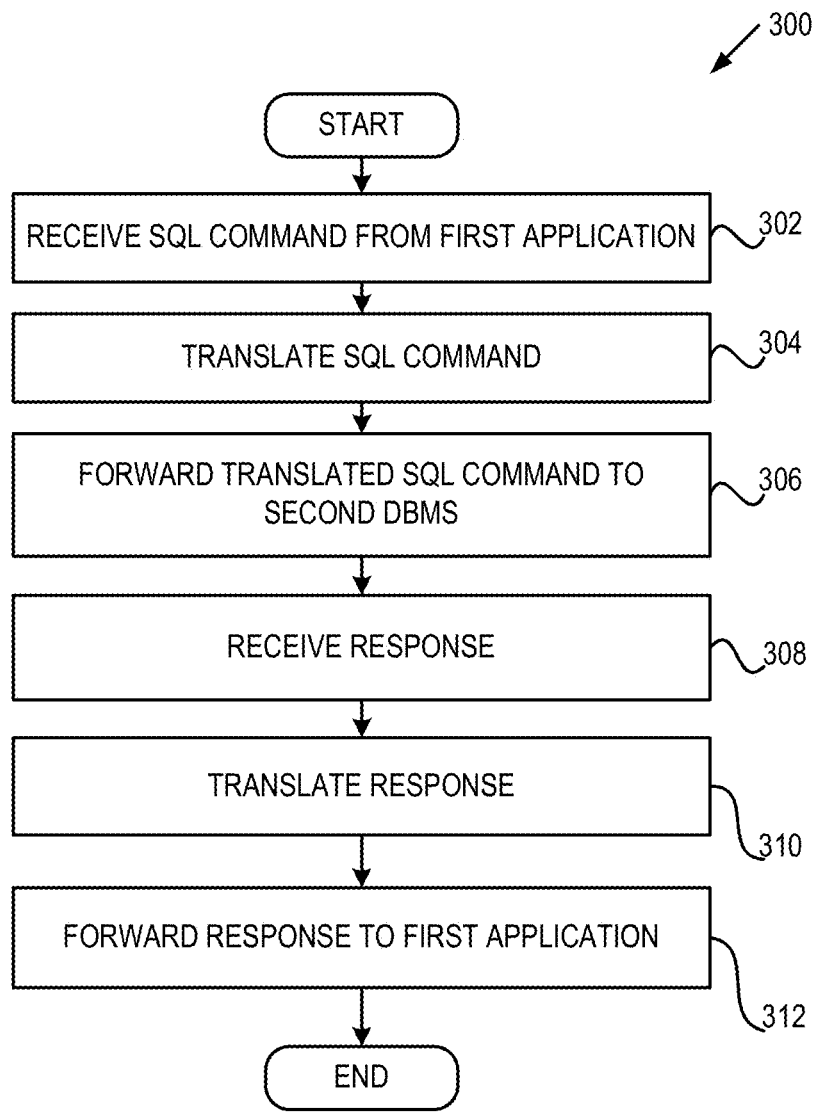
FIG. 3 is a flowchart of one embodiment of a process for rewriting SQL commands and results.

FIG. 3 is a flowchart of one embodiment of a process 300 for rewriting SQL commands and results. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 300 is performed by a database proxy system, such as database proxy system 206 of FIG. 2.

Referring to FIG. 3, process 300 begins with processing logic receiving an SQL command from first DBMS communication module at block 302. In one embodiment, process 300 receives an SQL command with unsupported SQL language.

At block 304, process 300 rewrites the received SQL command. In one embodiment, process 300 identifies unsupported SQL language in the SQL command by identifying patterns of unsupported SQL language. Process 300 rewrites the identified language using a set of rules for rewriting SQL commands between the first DBMS 108A and second DBMS 108B. Rewriting of the SQL command is further described in FIG. 4. Process 300 forwards the rewritten SQL command to second DBMS at block 306. In one embodiment, process 300 forwards the rewritten SQL command to second DBMS 108B.

At block 308, process 300 receives the response from second DBMS. Process 300 translates the response, if necessary, at block 310. In one embodiment, process 300 compares the format of the received response with an expected response format for the received SQL command. If the two formats differ, process 300 translates the received response to the expected response format. For example, in one embodiment, first DBMS communication module 204 sends an SQL command to process 300 that instructs the first DBMS to retrieve a binary object. In this example, process 300 sends the object retrieval SQL command to second DBMS, which stores the object as a table of the object contents and not as a binary object. Process 300 translates this command into a request for the object contents and creates a binary object from the retrieved object contents. By creating the binary object, process 300 translates the response to the expected response format. Process 300 forwards the response to first DBMS communication module at block 312. For example, in one embodiment, process 300 forwards the binary object to first DBMS communication module 204.

Figure 4:
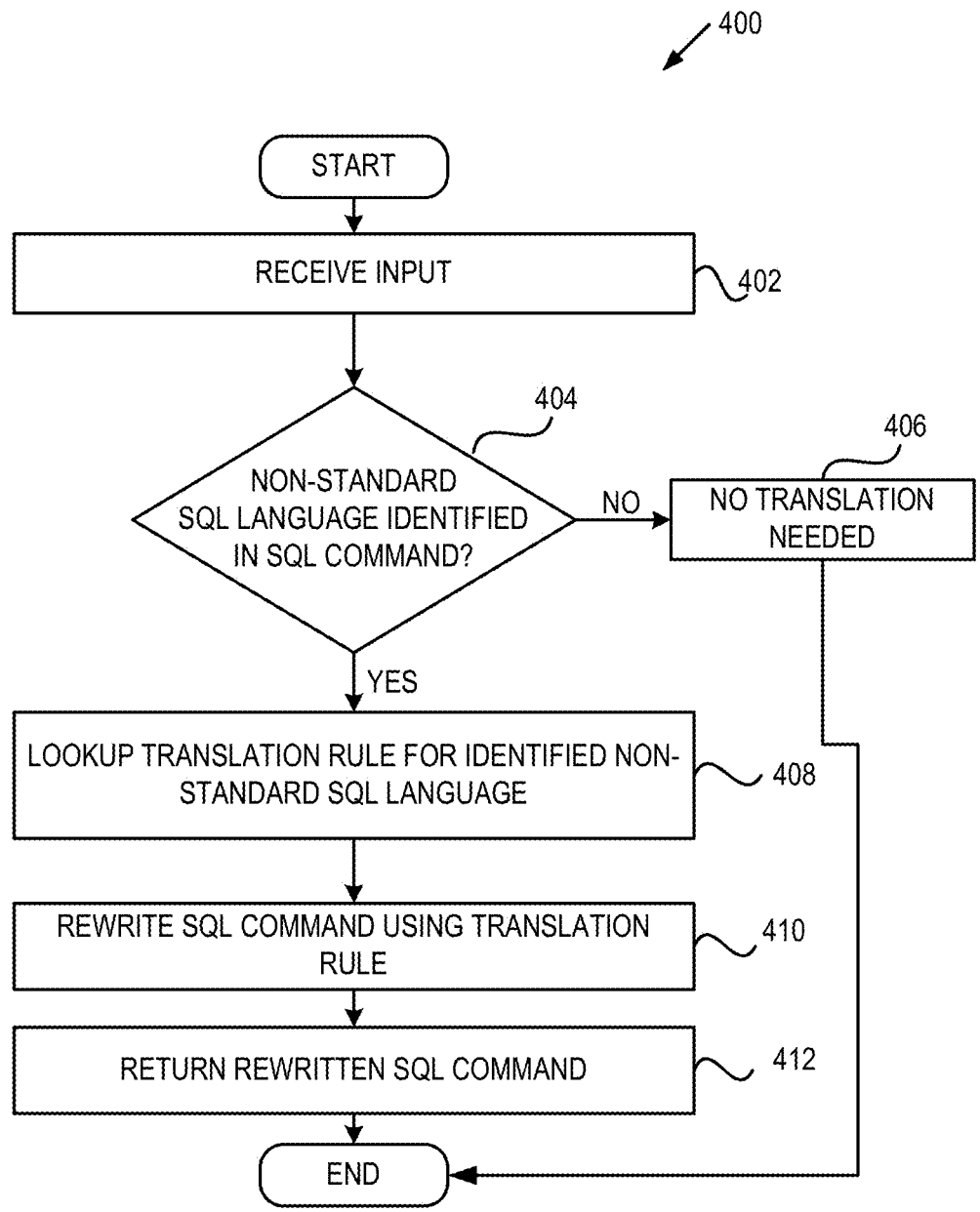
FIG. 4 is a flowchart of one embodiment of a process for rewriting SQL commands.

As described in FIG. 3, process 300 rewrites the SQL commands from one DBMS format to another using rules that indicate how to translate the SQL commands. FIG. 4 is a flowchart of one embodiment of a process 400 for rewriting SQL commands as described in FIG. 3, block 304. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 400 is performed by a database proxy system, such as database proxy system 206 of FIG. 2.

Referring to FIG. 4, process 400 begins with processing logic receiving input. In one embodiment, process 400 receives the SQL command, the first DBMS type, and the second DBMS type. The DBMS type is the type and version of DBMS used and can be of the DBMS known in the art (ORACLE™ DBMS, MYSQL™, IBM DB2™, POSTGRESQL™, MICROSOFT SQL™, etc.).

At block 404, process 400 identifies if there is any unsupported SQL language in the received SQL command. In one embodiment, process 400 identifies unsupported SQL by parsing the SQL command and identifying unsupported SQL patterns in the parsed SQL command. In one embodiment, process 400 identifies unsupported SQL patterns by comparing fragments of the parsed SQL command with a pattern dataset specific for SQL rewriting between first DBMS 108A and second DBMS 108B. For example, in one embodiment, a pattern dataset specific to an ORACLE DBMS™ includes the pattern "varchar2", which is a data type for a variable character used in table schema creation. As another example, process 400 identifies an outer join statement specific to ORACLE DBMS™. As in known in the art, an outer join is a table join operation that joins records from each original table including records not common to both tables. ORACLE™ specific syntax for outer join uses a "(+)" to signify an outer join operation as part of a SQL join syntax. Process 400 identifies the "(+)" syntax as ORACLE™ specific using the pattern dataset. As a further example, process 400 identifies a binary object being passed that is associated with the received SQL statement. In one embodiment, this SQL statement that indicates the binary object is to be stored as a binary object in the first DBMS.

In one embodiment, process 400 uses a pattern dataset for first DBMS that indicates the unsupported SQL language for the first DBMS. For example and in one embodiment, a pattern dataset for the ORACLE DBMS™ can include the "varachar2", "(+)", and object binary syntaxes. Pattern datasets for other DBMS includes data that indicates unsupported SQL language for that DBMS.

If there is no unsupported SQL language identified in the received SQL command, process 400 determines no SQL rewriting is needed for the received SQL command at block 406 and process 400 ends.

If there is unsupported SQL language identified in the received SQL command, process 400 looks up a rule for rewriting the unsupported SQL language at block 408. Process 400 uses this rule to rewrite the received SQL command into a new SQL command suitable for the second DBMS. For example and in one embodiment, the rule for translating ORACLE™ specific SQL datatype "varchar2" to SQL language suitable for a POSTGRESQL™ DBMS is to replace occurrences of the text "varchar2" with the text "varchar." As another example, the rule for translating ORACLE™ specific SQL outer joins using the "(+)" syntax in a SQL "select" statement to a SQL command suitable for the POSTGRESQL™ DBMS is to remove the "(+)" syntax and insert the words "FULL OUTER JOIN" in the appropriate position in the "select" statement. This rule illustrates a more complicated SQL rewriting, where "(+)" is removed at the end of the SQL select command and "FULL OUTER JOIN" is added in the middle of the SQL select command.

As a further example and in one embodiment, the rule for translating an SQL command to store a binary object is to extract the object contents from the binary object and convert the contents into a SQL "insert" command that inserts the object contents into a table corresponding to the binary object. To further illustrate, consider a binary object of type employee that has the contents of name ("John Smith"), hire date ("Jan. 1, 2000"), and department ("Sales"). This rule indicates to retrieve the object contents (name, hire date, and department) from the employee binary object and create an insert SQL command for this employee binary object. The insert SQL command for this example is:

insert into EMPLOYEE_TABLE (NAME, HIRE_DATE, DEPARTMENT) values ('John Smith', 'Jan. 1, 2000', 'sales');

where EMPLOYEE_TABLE is the table used to store the employee binary object contents, and NAME, HIRE_DATE, DEPARTMENT are the table columns used to store the employee binary object contents name, hire date, and department, respectively.

An another example, process 400 rewrites a DBMS's package to a prefixed namespace. A package is a collection of functions, variables, constants, exceptions, cursors, and subprograms that can be referenced from outside the package. Use of these packages for one DBMS can be rewritten into prefixed namespaces for another DBMS. For example and in one embodiment, ORACLE™ packages are rewritten into "prefixed namespaces" for POSTGRESQL™. In this example for ORACLE DBMS,™ an example package "systems" is used, which provides the example functions and procedures of:

get_name(id)
    set_name(id, name)
    delete(id)

Outside of the systems package, the systems functions and/or procedures are references in an ORACLE DBMS™ as:

systems.get_name(id)
    systems.set_name(id, name)
    systems.delete(id)

In one embodiment, certain versions of POSTGRESQL™ lack the support for packages. However, a package can be implemented in POSTGRESQL™ using global functions and/or procedures with the package designator prefixed to the name:

systems_get_name(id)
    systems_set_name(id, name)
    systems_delete(id)

In this example, an underscore ("_") is used to separate the package name and the function, procedure, etc. Alternatively, another separator can be used (".", ":", etc.).

In this example, in referencing the functions and/or procedures from within the bodies of the packet, the original code is used reference the object name, without the package name. For example and in one embodiment, to call systems.get_name from within systems.delete, the code would be:

name=get_name(id)

and not name=systems_get_name(id)

In this example, process 400 rewrites the SQL based on the context of the SQL command. In this example, the namespace is prepended to the function and/or procedure call if this function and/or procedure call is made outside the package. If this function and/or procedure is made inside the "systems" package, no namespace is prepended. In one embodiment, process 400 keeps track of which package process 400 is processing (e.g., package creation, package modification, etc.). In this embodiment, process 400 uses the database schema to determine whether or not to prepend the namespace name to the function and/or procedure call. As an example, process 400 uses the database schema to determine there is not a systems_delete procedure in the original first database schema that leads to a namespace clash.

As another example, process 400 replaces objects with function and/or procedure calls. In this embodiment, process 400 rewrites select student.name( )
    from active_students
    where student.yob=1980;

to select get_student_name(id)
    from active_students
    where yob=1980;

Another example is process 400 replacing a table of objects by a table that has those object attributes as columns.

In one embodiment, the rules are stored in a rules database that is stored locally on the database proxy system (in memory, on disk, in a DBMS running on the database proxy system, etc.). In another embodiment, the rules are stored in a database that is remote from the database proxy system. In this embodiment, process 400 sends a request for the rule based on the identified unsupported SQL language from another computer that include the rules database. This rules database computer sends the corresponding rule to database proxy system. The rules database computer can be another database proxy system, a central rules database, etc. In one embodiment, the database proxy system receives updates of the rules as updates to the rules become available.

At block 410, process 400 rewrites the SQL command using the rule retrieved in block 408. Examples of how process 400 uses the rule to rewrite the received SQL command are described above with reference to block 408. Process 412 returns the rewritten SQL command at block 412.

Figure 5:
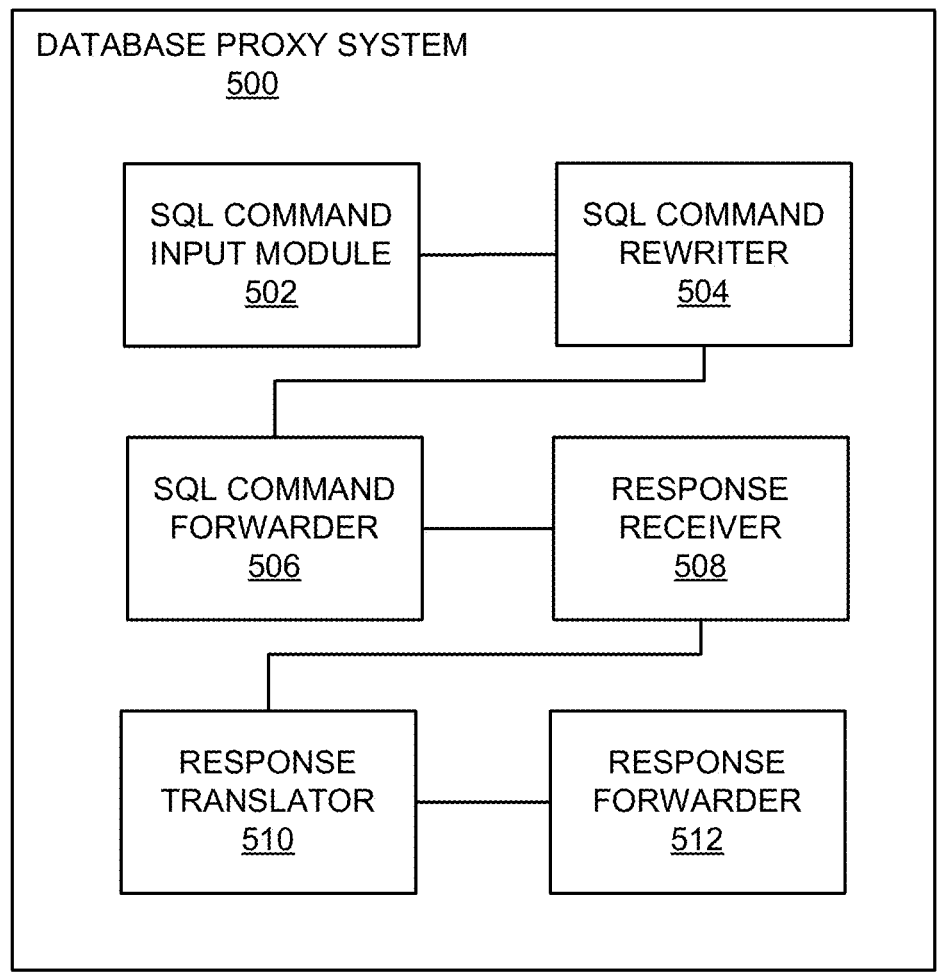
FIG. 5 is a block diagram of a database proxy system that translates SQL commands and responses.

FIG. 5 is a block diagram of a database proxy system 500 that translates SQL commands and responses. In one embodiment, database proxy system 500 is a stand alone system that rewrites SQL commands from multiple first DBMS communication modules to multiple DBMS of different and/or the same DBMS type. In an alternate embodiment, database proxy system 500 is on the same computer that is executing the first DBMS communication module. In FIG. 5, database proxy system 500 comprises SQL command input module 502, SQL command rewriter 504, SQL command forwarder 506, response receiver 508, response translator 510, and response forwarder 512. SQL command input module 502 receives the SQL command from first DBMS communication module as described in FIG. 3, block 302. SQL command rewriter 504 rewrites the received SQL command as described in FIG. 3, block 304. SQL command forwarder 506 forwards the rewritten SQL command to second DBMS as described in FIG. 3, block 306. Response receiver 508 receives the response from second DBMS as described in FIG. 3, block 308. Response translator 510 translates the received response from second DBMS as described in FIG. 3, block 310. Response forwarder 512 forwards the rewritten response from second DBMS as described in FIG. 3, block 312.

Figure 6:
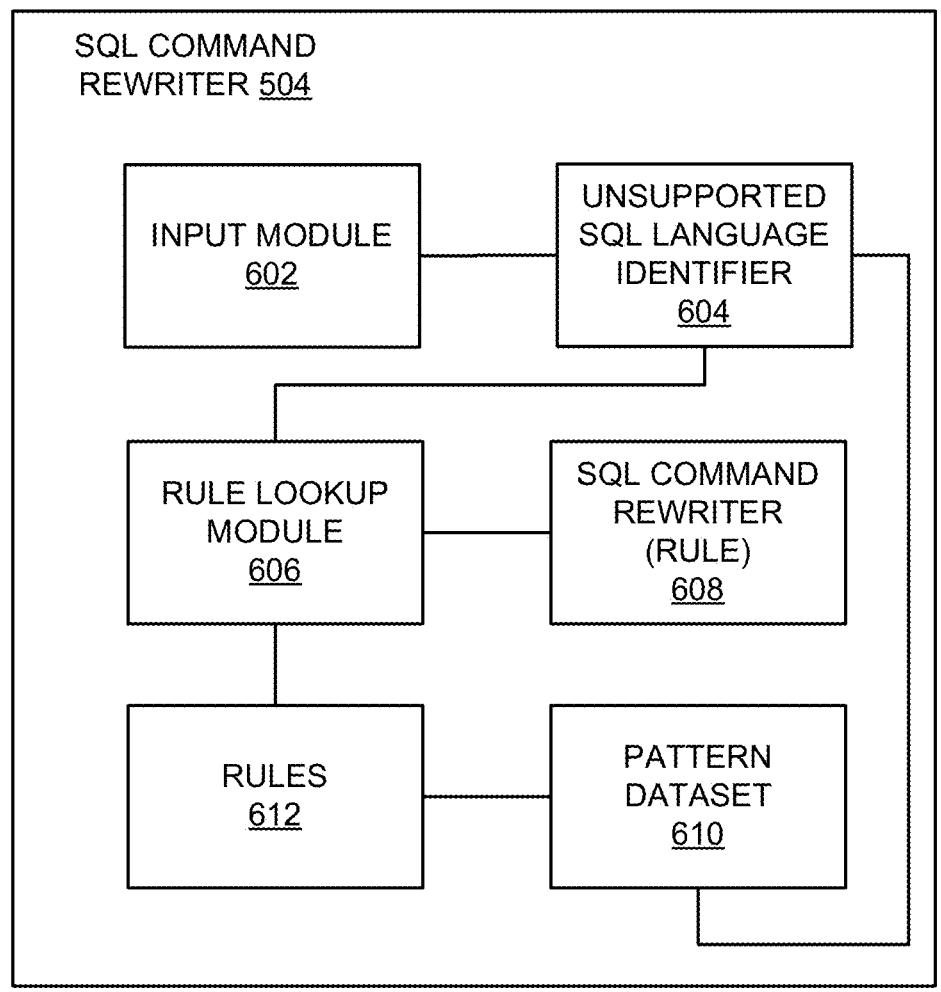
FIG. 6 is a block diagram of a SQL command translator that translates SQL commands.

FIG. 6 is a block diagram of a SQL command rewriter 504 that rewrites the received SQL commands. In one embodiment, SQL command rewriter 504 is part of database proxy system 500. SQL command rewriter 504 comprises input module 602, unsupported SQL language identifier 604, rule lookup module 606, SQL command rewriter (rule) 608, pattern dataset 610, and rules 612. Input module receives the SQL command, first DBMS type and second DBMS type as described in FIG. 4, block 402, unsupported SQL language identifier 604 identifies any possible unsupported SQL language in the received SQL command as described in FIG. 4, block 404. In one embodiment, unsupported SQL language identifier 604 uses pattern dataset 612 to identify the possible unsupported SQL language. Rule lookup module 606 looks up the appropriate rule to be used by SQL command rewriter (rule) 608 to rewrite the received SQL command as described in FIG. 4, block 408. SQL command rewriter (rule) 608 rewrites the SQL command using the appropriate rule as described in FIG. 4, block 410. Pattern dataset includes patterns of unsupported SQL language for a particular DBMS as described in FIG. 4, block 404. Rules 612 is a rules database module used by SQL command rewriter (rule) 608 to retrieve the appropriate rule to rewrite the SQL command as described with reference to FIG. 4, block 410.

Figure 7:
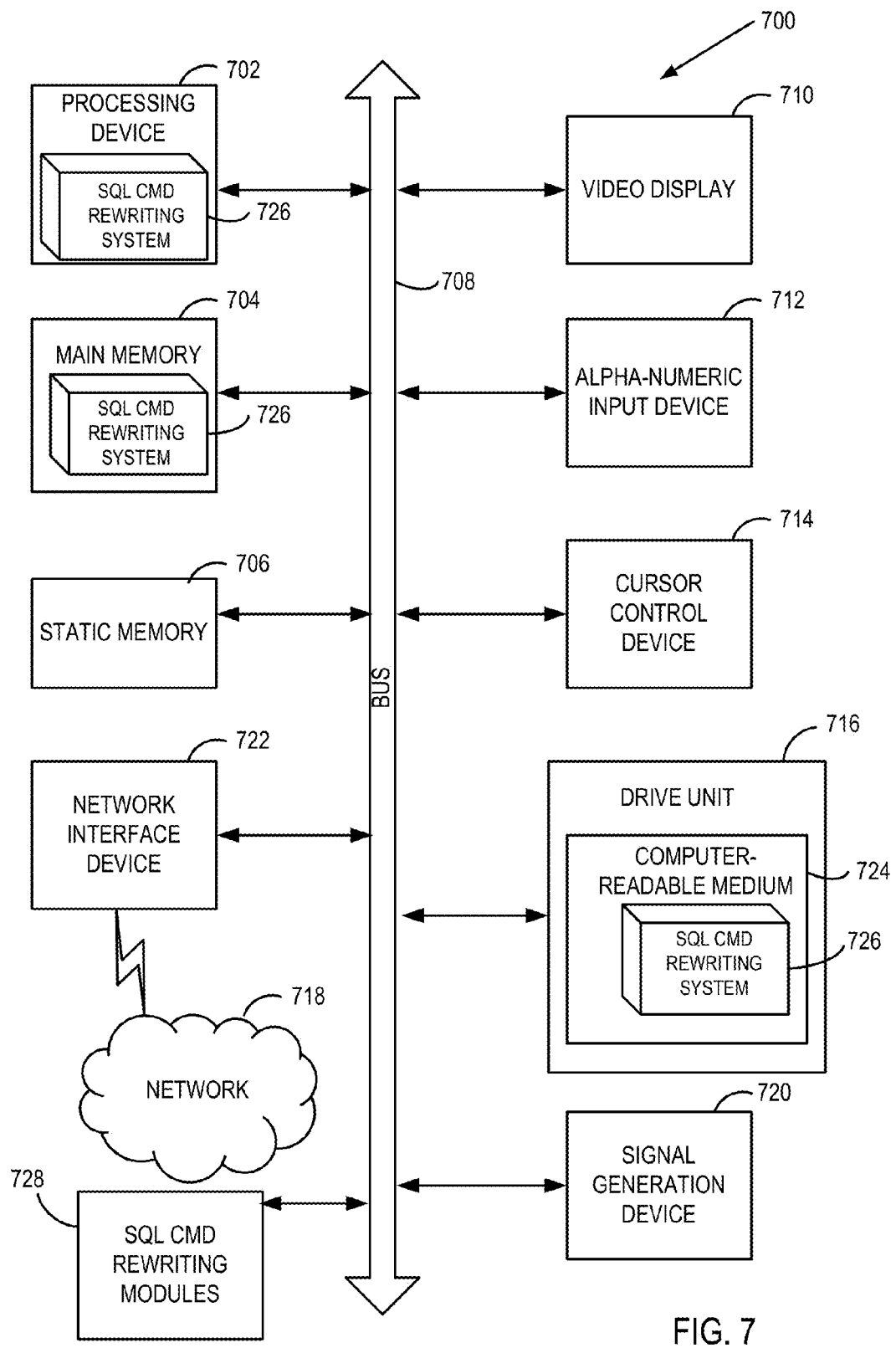
FIG. 7 is a diagram of one embodiment of a computer system for database proxy system.

FIG. 7 is a diagram of one embodiment of a database proxy system for SQL command rewriting. Within the database proxy system 700 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer sending the SQL commands and the server computer rewriting the SQL commands) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary database proxy system 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory 716 (e.g., a data storage device in the form of a drive unit, which may include fixed or removable computer-readable storage medium), which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the SQL rewriting system 726 for performing the operations and steps discussed herein.

The database proxy system 700 may further include a network interface device 722. The database proxy system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions (e.g., the SQL command rewriting system 726) embodying any one or more of the methodologies or functions described herein. The SQL command rewriting system 726 may also reside, completely or at least partially, within the main memory 704 and/or within the processing device 702 during execution thereof by the database proxy system 700, the main memory 704 and the processing device 702 also constituting machine-readable storage media. The SQL command rewriting system 726 may further be transmitted or received over a network 718 via the network interface device 722.

The computer-readable storage medium 724 may also be used to store the SQL command rewriting system 726 persistently. While the computer-readable storage medium 726 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 728, components and other features described herein (for example in relation to FIG. 1) can be implemented as discrete hardware components or integrated in the functionality of hardware components such as ASICS, FPGAs, DSPs or similar devices. In addition, the modules 728 can be implemented as firmware or functional circuitry within hardware devices. Further, the modules 728 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "rewriting," "forwarding," "identifying," "sending," "creating," "retrieving," "translating," "transmitting" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for SQL rewriting has been described. It is to be understood that the above description is intended to be illustrative and not restrictive. Many other embodiments will be apparent to those of skill in the art upon reading and understanding the above description. The scope of the invention should, therefore, be determined with reference to the appended claims, along, with the full scope of equivalents to which such claims are entitled.

The invention claimed is:

1. A method comprising:
receiving a first database command at a database proxy system, the first database command to operate with a first database management system, the first database command comprising language that is specific to the first database management system, the first database command not supported by a second database management system;
identifying, by the database proxy system, the language in the first database command specific to the first database management system by comparing fragments of the first database command with a plurality of pattern datasets corresponding to a plurality of database management systems to match a pattern dataset specific to the second database management system;
rewriting, by the database proxy system, the first database command to one or more second database commands supported by the second database management system using a rule associated with rewriting the identified language to modified language in the one or more second database commands to improve computational efficiency related to non-standard schema creation language for specific types of commands comprising outer joins;
forwarding, by the database proxy system, the one or more second database commands to the second database management system.

2. The method of claim 1, wherein the first database command is a database schema command specific to the first database management system and the rewriting rewrites the database schema command to a different database schema command supported by the second database management system.

3. The method of claim 1, wherein the first database command includes an object binary suitable for storage in a binary format in the first database management system and the rewriting includes converting the object binary to a format to store in a table of the second database management system.

4. The method of claim 3, wherein the converting the object binary includes converting the object binary to a textual representation of the object binary.

5. The method of claim 1, further comprising:
retrieving object contents of a requested binary object from the second database management system, wherein the first database command requested the retrieval of the binary object;
creating the binary object from the retrieved object contents; and
transmitting the binary object.

6. The method of claim 1, wherein the first database management system is one of an ORACLE, MICROSOFT SQL, MYSQL, POSTGRESS SQL, and IBM DB2 database management system.

7. The method of claim 1, wherein the second database management system is one of an ORACLE, MICROSOFT SQL, MYSQL, POSTGRESS SQL, and IBM DB2 database management system.

8. The method of claim 1, wherein the first database command is a structured query language command.

9. The method of claim 1, wherein the one or more second database commands is a structured query language command.

10. The method of claim 1, wherein the first database command received at the database proxy system comprises a procedure call associated with a package of the first database management system.

11. The method of claim 10, further comprising rewriting the procedure call in the first command to a prefixed namespace by prepending the package namespace to the procedure call.

12. The method of claim 11, wherein the rewriting the procedure call is performed in response to a determination that the second database management system does not support packages.

13. The method of claim 11, wherein the rewriting the procedure call is performed in response to a determination that the procedure call is made outside of the package.

14. The method of claim 1, further comprising:
receiving results of the one or more second database commands from the second database management system; and
translating the results to a format supported by an application that originated the first database command.

15. The method of claim 1, further comprising receiving, from a rules database communicatively coupled to the database proxy system, an update to the plurality of pattern datasets.

16. The method of claim 15, wherein the rules database updates the plurality of pattern datasets in response to receiving an update to rules associated with rewriting the identified language.

17. A non-transitory computer readable storage medium having instructions stored thereon that, when executed by a processing system, cause the processing system to perform operations comprising:
receiving a first database command at a database proxy system, the first database command to operate with a first database management system, the first database command comprising language that is specific to the first database management system, the first database command not supported by a second database management system;
identifying the language in the first database command specific to the first database management system by comparing fragments of the first database command with a plurality of pattern datasets corresponding to a plurality of database management systems to match a pattern dataset specific to the second database management system;
rewriting, by the database proxy system, the first database command to one or more second database commands supported by the second database management system using a rule associated with rewriting the identified language to modified language in the one or more second database commands to improve computational efficiency related to non-standard schema creation language for specific types of commands comprising outer joins;
forwarding, by the database proxy system, the one or more second database commands to the second database management system.

18. The non-transitory computer readable storage medium of claim 17, further comprising:
retrieving object contents of a requested binary object from the second database management system, wherein the first database command requested the retrieval of the binary object;
creating the binary object from the retrieved object contents; and
transmitting the binary object.

19. The non-transitory computer readable storage medium of claim 17, wherein the processing system further receives an update to the plurality of pattern datasets from a rules database communicatively coupled to the database proxy system.

20. The non-transitory computer readable storage medium of claim 19, wherein the rules database updates the plurality of pattern datasets in response to receiving an update to rules associated with rewriting the identified language.

21. A database proxy system comprising:
a processing device;
a command input module, executed by the processing device, to receive a first database command, the first database command to operate with a first database management system, the first database command to include language that is specific to the first database management system, the first database command not supported by a second database management system;
a language identifying module, executed by the processing device, to identify the language in the first database command specific to the first database management system by comparing fragments of the first database command with a plurality of pattern datasets corresponding to a plurality of database management systems to match a pattern dataset specific to the second database management system;
a command rewriting module, coupled to the command input module, to rewrite the first database command to one or more second database commands supported by the second database management system using a rule associated with rewriting the identified language to modified language in the one or more second database commands to improve computational efficiency related to non-standard schema creation language for specific types of commands comprising outer joins;
a first command forwarding module, coupled to the command input module, to forward the one or more second database commands to the second database management system.

22. The database proxy system of claim 21, further comprising:
a response translating module, coupled to the command input module, to retrieve object contents of a requested binary object from the second database management system, wherein the first database command requested the retrieval of the binary object, and to create the binary object from the retrieved object contents; and
a response transmission module, coupled to the command input module, to transmit the binary object.

23. The database proxy system of claim 21, further comprising:
a response receiver, coupled to the second database management system, to receive results of the one or more second database commands from the second database management system; and
a response translator coupled to the response receiver to translate results to a format supported by an application that originated the first database command.

24. The database proxy system of claim 21, wherein the language identifying module receives an update to the plurality of pattern datasets from a rules database communicatively coupled to the database proxy system.

25. The database proxy system of claim 24, wherein the rules database updates the plurality of pattern datasets in response to receiving an update to rules associated with rewriting the identified language.

* * * * *